(12) United States Patent
Chen et al.

(10) Patent No.: US 11,019,343 B2
(45) Date of Patent: May 25, 2021

(54) DATA BLOCK ENCODING METHOD AND APPARATUS

(71) Applicant: Huawei Technologies Co., Ltd., Guangdong (CN)

(72) Inventors: Shaolin Chen, Shenzhen (CN); Xiaohong Xiang, Singapore (SG); Dongsheng Wu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 195 days.

(21) Appl. No.: 15/660,737

(22) Filed: Jul. 26, 2017

(65) Prior Publication Data
US 2018/0035116 A1    Feb. 1, 2018

(30) Foreign Application Priority Data

Jul. 28, 2016 (CN) .......................... 201610616653.1

(51) Int. Cl.
*H04N 19/147* (2014.01)
*H04N 19/119* (2014.01)
(Continued)

(52) U.S. Cl.
CPC ......... *H04N 19/147* (2014.11); *H04N 19/119* (2014.11); *H04N 19/122* (2014.11);
(Continued)

(58) Field of Classification Search
None
See application file for complete search history.

(56) References Cited

U.S. PATENT DOCUMENTS 6,037,985 A * 3/2000 Wong ............... H04N 19/176
375/240.03
6,983,079 B2  1/2006 Kim
(Continued)

FOREIGN PATENT DOCUMENTS

CN    101534448 A    9/2009
CN    101945275 A    1/2011
(Continued)

OTHER PUBLICATIONS

Sun et al. ("Perceptually Adaptive Rate-Distortion Optimization for Variable Block Size Motion Alignment in 3D Wavelet Coding") (Year: 2005).*
(Continued)

Primary Examiner — Mohammed Jebari
(74) Attorney, Agent, or Firm — Womble Bond Dickinson (US) LLP

(57) ABSTRACT

A data block encoding method and apparatus are provided. The data block encoding method includes: determining whether a data block includes an intensive edge region, where the intensive edge region is a region including an image distortion generated by ring noise, and the data block is a data block in a to-be-encoded image; and when the data block includes an intensive edge region, reducing a value of a quantization parameter used for encoding the data block, and encoding the data block by using a reduced value of the quantization parameter, or dividing the data block into multiple coding units of different sizes according to different coding layers, adjusting rate-distortion costs of the multiple coding units of different sizes, and encoding the data block by using a coding unit with a minimum rate-distortion cost obtained after the adjustment.

10 Claims, 9 Drawing Sheets

(51) Int. Cl.
*H04N 19/124* (2014.01)
*H04N 19/14* (2014.01)
*H04N 19/176* (2014.01)
*H04N 19/196* (2014.01)
*H04N 19/18* (2014.01)
*H04N 19/122* (2014.01)
*H04N 19/60* (2014.01)

(52) U.S. Cl.
CPC ........... *H04N 19/124* (2014.11); *H04N 19/14* (2014.11); *H04N 19/176* (2014.11); *H04N 19/18* (2014.11); *H04N 19/196* (2014.11); *H04N 19/60* (2014.11)

(56) References Cited

U.S. PATENT DOCUMENTS

| | | | |
|---|---|---|---|
| 2009/0074058 A1 | 3/2009 | Zhang et al. | |
| 2009/0110063 A1* | 4/2009 | Nakayama | H04N 19/176 375/240.03 |
| 2009/0148062 A1 | 6/2009 | Gabso et al. | |
| 2010/0220937 A1 | 9/2010 | Furbeck | |
| 2015/0003518 A1 | 1/2015 | Nguyen et al. | |
| 2015/0189269 A1* | 7/2015 | Han | H04N 19/176 375/240.12 |
| 2016/0044315 A1 | 2/2016 | Sun et al. | |
| 2016/0156911 A1* | 6/2016 | Mitasaki | H04N 19/119 375/240.16 |
| 2017/0180738 A1* | 6/2017 | Park | H04N 19/107 |

FOREIGN PATENT DOCUMENTS

| | | |
|---|---|---|
| CN | 102123285 A | 7/2011 |
| CN | 103079063 A | 5/2013 |
| CN | 103888764 A | 6/2014 |
| CN | 104270641 A | 1/2015 |
| JP | 2827319 B2 | 4/1991 |

OTHER PUBLICATIONS

ITU-T H.265, "Series H: Audiovisual and Multimedia Systems Infrastructure of audiovisual services—Coding of moving video, High efficiency video coding," (Apr. 2015), 634 pages.

* cited by examiner

Frequency distribution in a transform domain: 1, 2, and 3 respectively correspond to vertical, horizontal, and diagonal directions

DATA BLOCK ENCODING METHOD AND APPARATUS

CROSS-REFERENCE TO RELATED APPLICATION

This application claims priority to Chinese Patent Application No. 201610616653.1, filed on Jul. 28, 2016, which is hereby incorporated by reference in its entirety.

TECHNICAL FIELD

The present disclosure relates to the image encoding field, and in particular, to a data block encoding method and apparatus.

BACKGROUND

Currently, during image transmission, discrete cosine transform (DCT)-based lossy encoding is generally performed on a data block included in an image. By using a feature that a human visual system (HVS) is insensitive to high frequency information, quantization is performed to cancel a high frequency coefficient of a transform domain, so that an objective of image compression is achieved. In this case, when the image is compressed, ring noise, fixed-pattern noise, or the like is also caused, and as a compression rate increases, noise intensity increases gradually. Consequently, subjective image quality is severely affected. A DCT transform size directly determines a range of ring diffusion. For example, in H.265/high efficiency video coding (HEVC), a supported maximum DCT transform size is a 32×32 data block. In comparison with H.264/advanced video coding (AVC) in which a maximum DCT transform size is an 8×8 data block, a compression rate increases, but a ring phenomenon also becomes severer, and subjective image quality is greatly affected.

Therefore, a problem urgently to be resolved is how to reduce an image distortion phenomenon in a process of encoding an image by using a high compression rate.

SUMMARY

An objective of the present disclosure is to provide a data block encoding method and apparatus to effectively avoid an image distortion phenomenon in a process of encoding an image by using a high compression rate.

The foregoing objective and other objectives are achieved by using characteristics in independent claims. Further implementations are embodied in dependent claims, the specification, and the drawings.

According to a first aspect, a data block encoding method is provided and includes:

determining whether a data block included in a to-be-encoded image includes an intensive edge region, where the intensive edge region is a region including an image distortion generated by ring noise; and when determining that the data block is a data block including an intensive edge region, reducing a value of a quantization parameter used for encoding the data block, and encoding the data block by using a reduced value of the quantization parameter; or when the data block includes an intensive edge region, dividing the data block into multiple coding units (CU) of different sizes according to different coding layers, adjusting rate-distortion costs of the multiple coding units of different sizes, and encoding the data block by using a coding unit with a minimum rate-distortion cost obtained after the adjustment.

A coding unit is a most basic coding unit that is used for encoding a data block and includes a basic syntax structure. A transform unit is a transform block used in a transform process. A size of a coding unit and a size of a transform unit may be 4×4, 8×8, 16×16, 32×32, or the like.

In the data block encoding method provided by the first aspect, whether each data block in multiple data blocks forming an image includes an intensive edge region is determined; and for a data block including an intensive edge region, a value of a quantization parameter is reduced, and the data block is encoded by using a reduced value of the quantization parameter, or the data block is divided into multiple coding units of different sizes according to different coding layers, rate-distortion costs of the multiple coding units of different sizes are adjusted, and the data block is encoded by using a coding unit with a minimum rate-distortion cost obtained after the adjustment. Because a small coding unit may suppress a ring effect within a small range, reducing a size of a coding unit corresponding to a data block including an intensive edge region may reduce ring noise generated in a process of encoding the data block, reduce an image distortion phenomenon generated by the ring noise, and improve quality of the encoded image.

With reference to the first aspect, in a first possible implementation, the determining whether the data block includes an intensive edge region includes:

dividing the data block into A sub data blocks; obtaining a variance of the data block and a variance of each sub data block in the A sub data blocks; and when the variance of the data block is greater than a first threshold, and in the variances of the A sub data blocks, a maximum variance is greater than k times a minimum variance, determining that the data block includes an intensive edge region, where A is a positive integer greater than or equal to 2, k is an integer, and the first threshold is determined by a bit width used by a pixel value in the to-be-encoded image.

With reference to the first possible implementation, in a second possible implementation, when the variance of the data block is less than or equal to the first threshold, or in the variances of the A sub data blocks, the maximum variance is less than or equal to k times the minimum variance, the method further includes:

dividing each sub data block in the A sub data blocks into B sub-sub data blocks; obtaining the variance of each of the A sub data blocks and a variance of each sub-sub data block in the B sub-sub data blocks included in each sub data block; and when the variance of any sub data block is greater than the first threshold, and in the variances of the B sub-sub data blocks included in the any sub data block, a maximum variance is greater than k times a minimum variance, determining that the data block includes an intensive edge region.

A is a positive integer greater than or equal to 2. K is an empirical value 5, 4, or 3. The first threshold is 32. According to experience, it is recommended that A is 4 and that sizes of data blocks are the same. For example, one 64×64 data block may be divided into four 32×32 data blocks.

As can be learned from above, the present disclosure provides a method for determining, based on a notable change of local statistics in a data block, whether the data block includes an intensive edge. Logic implementation of the method is simple, and the method has robustness against noise.

With reference to the second possible implementation, in a third possible implementation, the reducing a value of a quantization parameter used for encoding the data block includes:

reducing, according to a first formula, the value of the quantization parameter used for encoding the data block, where the first formula is:

$$QP'=QP-\text{delta},$$

where QP' indicates a value of the quantization parameter after the adjustment, QP indicates a value of the quantization parameter before the adjustment, delta indicates an adjustment magnitude, and the adjustment magnitude is any integer greater than 0 but less than 15.

With reference to the second possible implementation or the third possible implementation, in a fourth possible implementation, the adjusting rate-distortion costs of the multiple coding units of different sizes includes:

adjusting the rate-distortion costs of the multiple coding units of different sizes according to a second formula, where the second formula is:

$$RdoCost_N'=C_N \times RdoCost_N,$$

where $RdoCost_N'$ indicates a rate-distortion cost of a coding unit of a size N after the adjustment, $C_N$ indicates a first adjustment coefficient corresponding to the coding unit of the size N, a value of the first adjustment coefficient is proportional to the size of the coding unit, $RdoCost_N$ indicates a rate-distortion cost of the coding unit of the size N before the adjustment, and N indicates the size of the coding unit.

According to a second aspect, a data block encoding method is provided and includes:

obtaining a transformed and quantized data block, where the transformed and quantized data block includes a high frequency region, the high frequency region includes a transformed and quantized high frequency coefficient, and the data block is a data block in a to-be-encoded image; then determining, according to a distribution characteristic of the transformed and quantized high frequency coefficient in the high frequency region, that the data block includes fixed-pattern noise; and canceling the transformed and quantized high frequency coefficient that causes the fixed-pattern noise, or reducing a size of a transform unit of the data block by adjusting a rate-distortion cost of the transform unit (TU) of the data block. Because a frequency component that may cause fixed-pattern noise is canceled through quantization, during encoding, occurrence of fixed-pattern noise is controlled. Alternatively, rate-distortion costs are adjusted so that a smaller transform unit is selected. After the smaller transform unit is used, a quantization parameter does not meet a condition for occurrence of fixed-pattern noise, and naturally, fixed-pattern noise is canceled. In this way, in a process of encoding an image by using a high compression rate, an image distortion phenomenon generated by fixed-pattern noise can be avoided effectively.

With reference to the second aspect, in a first possible implementation, the high frequency region includes a high frequency region in which a horizontal component is preponderant, a high frequency region in which a vertical component is preponderant, and a high frequency region in which an angular component is preponderant, and before the determining, according to a distribution characteristic of the transformed and quantized high frequency coefficient in the high frequency region, that the data block includes fixed-pattern noise, the method further includes:

obtaining a quantity a of transformed and quantized non-zero high frequency coefficients of the high frequency region in which the horizontal component is preponderant, a quantity b of transformed and quantized non-zero high frequency coefficients of the high frequency region in which the vertical component is preponderant, and a quantity c of transformed and quantized non-zero high frequency coefficients of the high frequency region in which the angular component is preponderant; and the determining, according to a distribution characteristic of the transformed and quantized high frequency coefficient in the high frequency region, that the data block includes fixed-pattern noise, includes:

when a is greater than 0 but less than a second threshold, and b is equal to 0, and c is equal to 0, determining that the transformed and quantized non-zero high frequency coefficients of the high frequency region in which the horizontal component is preponderant cause the fixed-pattern noise;

when b is greater than 0 but less than a second threshold, and a is equal to 0, and c is equal to 0, determining that the transformed and quantized non-zero high frequency coefficients of the high frequency region in which the vertical component is preponderant cause the fixed-pattern noise;

when c is greater than 0 but less than a second threshold, and a is equal to 0, and b is equal to 0, determining that the transformed and quantized non-zero high frequency coefficients of the high frequency region in which the angular component is preponderant cause the fixed-pattern noise;

when a sum of a and b is greater than 0 but less than a third threshold, and a is greater than 0, and b is greater than 0, and c is equal to 0, determining that the transformed and quantized non-zero high frequency coefficients of the high frequency region in which the horizontal component is preponderant and the transformed and quantized non-zero high frequency coefficients of the high frequency region in which the vertical component is preponderant jointly cause the fixed-pattern noise;

when a sum of b and c is greater than 0 but less than a third threshold, and b is greater than 0, and c is greater than 0, and a is equal to 0, determining that the transformed and quantized non-zero high frequency coefficients of the high frequency region in which the vertical component is preponderant and the transformed and quantized non-zero high frequency coefficients of the high frequency region in which the angular component is preponderant jointly cause the fixed-pattern noise;

when a sum of a and c is greater than 0 but less than a third threshold, and a is greater than 0, and c is greater than 0, and b is equal to 0, determining that the transformed and quantized non-zero high frequency coefficients of the high frequency region in which the horizontal component is preponderant and the transformed and quantized non-zero high frequency coefficients of the high frequency region in which the angular component is preponderant jointly cause the fixed-pattern noise; or when a sum of a, b, and c is greater than 0 but less than a fourth threshold, and a is greater than 0, and b is greater than 0, and c is greater than 0, determining that the transformed and quantized non-zero high frequency coefficients of the high frequency region in which the horizontal component is preponderant, the transformed and quantized non-zero high frequency coefficients of the high frequency region in which the vertical component is preponderant, and the transformed and quantized non-zero high frequency coefficients of the high frequency region in which the angular component is preponderant jointly cause the fixed-pattern noise.

With reference to the first possible implementation, in a second possible implementation, the canceling the transformed and quantized high frequency coefficient that causes the fixed-pattern noise includes:

quantizing the non-zero high frequency coefficients of the high frequency regions included in the data block to 0.

Optionally, the non-zero high frequency coefficients of the high frequency regions included in the data block may be deleted directly, so that the non-zero high frequency coefficients of the high frequency regions in the data block are canceled.

With reference to the first possible implementation, in a third possible implementation, the reducing a size of a transform unit of the data block by adjusting a rate-distortion cost of the transform unit of the data block includes:

adjusting, according to a third formula, the rate-distortion cost of the transform unit of the data block, where the third formula is:

$$RdoCost_N' = \alpha \times RdoCost_N,$$

where $RdoCost_N'$ indicates a rate-distortion cost of a transform unit of a size N after the adjustment, $\alpha$ indicates a second adjustment coefficient, the second adjustment coefficient is an integer greater than 1, $RdoCost_N$ indicates a rate-distortion cost of the transform unit of the size N before the adjustment, and N indicates the size of the transform unit of the data block.

According to a third aspect, a data block encoding apparatus is provided and includes:

a determining unit, configured to determine whether a data block includes an intensive edge region, where the intensive edge region is a region including an image distortion generated by ring noise, and the data block is a data block in a to-be-encoded image; and a processing unit, configured to: when the data block includes an intensive edge region, reduce a value of a quantization parameter QP used for encoding the data block, and encode the data block by using a reduced value of the quantization parameter, or divide the data block into multiple coding units of different sizes according to different coding layers, adjust rate-distortion costs of the multiple coding units of different sizes, and encode the data block by using a coding unit with a minimum rate-distortion cost obtained after the adjustment.

According to a fourth aspect, a data block encoding apparatus is provided and includes:

an obtaining unit, configured to obtain a transformed and quantized data block, where the transformed and quantized data block includes a high frequency region, the high frequency region includes a transformed and quantized high frequency coefficient, and the data block is a data block in a to-be-encoded image; a determining unit, configured to determine, according to a distribution characteristic of the transformed and quantized high frequency coefficient in the high frequency region, that the data block includes fixed-pattern noise; and a processing unit, configured to cancel the transformed and quantized high frequency coefficient that causes the fixed-pattern noise, or reduce a size of a transform unit of the data block by adjusting a rate-distortion cost of the transform unit of the data block. For specific implementations, refer to functions of actions in the data block encoding method provided by the second aspect.

It should be noted that, functional modules in the third aspect and the fourth aspect may be implemented by hardware, or may be implemented by corresponding software executed by hardware. The hardware or software includes one or more modules corresponding to the foregoing functions. For details, refer to functions of actions of a data block encoding apparatus in the data block encoding method provided by the first aspect, and functions of actions of a data block encoding apparatus in the data block encoding method provided by the second aspect.

In the present disclosure, names of the data block encoding apparatuses do not constitute a limitation on the devices themselves. In actual implementations, these devices may appear with other names. The devices shall fall within the scope of the claims of the present disclosure and equivalent technologies thereof so long as functions of the devices are similar to the present disclosure.

These aspects of the present disclosure or other aspects are clearer and more comprehensible in the following description of embodiments.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

A basic principle of the present disclosure is as follows: First, whether each data block in multiple data blocks forming an image includes an intensive edge region is determined, where the intensive edge region is a region including an image distortion generated by ring noise; and for a data block including an intensive edge region, a value of a quantization parameter is reduced, and the data block is encoded by using a reduced value of the quantization parameter, or the data block is divided into multiple coding units of different sizes according to different coding layers, rate-distortion costs of the multiple coding units of different sizes are adjusted, and the data block is encoded by using a coding unit with a minimum rate-distortion cost obtained after the adjustment. In this way, in a process of encoding an image by using a high compression rate, an image distortion phenomenon generated by fixed-pattern noise can be avoided effectively.

Further, after a data block is transformed and quantized, the transformed and quantized data block may include a region with an image distortion generated by fixed-pattern noise. First, it may be determined, according to a distribution characteristic of a transformed and quantized high frequency coefficient of a high frequency region included in the transformed and quantized data block, in the high frequency region, that the data block includes fixed-pattern noise. Then, the transformed and quantized high frequency coefficient that causes the fixed-pattern noise is canceled; or a size of a transform unit of the data block is reduced by adjusting a rate-distortion cost of the transform unit of the data block. In this way, in a process of encoding an image by using a high compression rate, an image distortion phenomenon generated by fixed-pattern noise can be avoided effectively.

The following describes implementations of the present disclosure in detail with reference to accompanying drawings.

Figure 1:
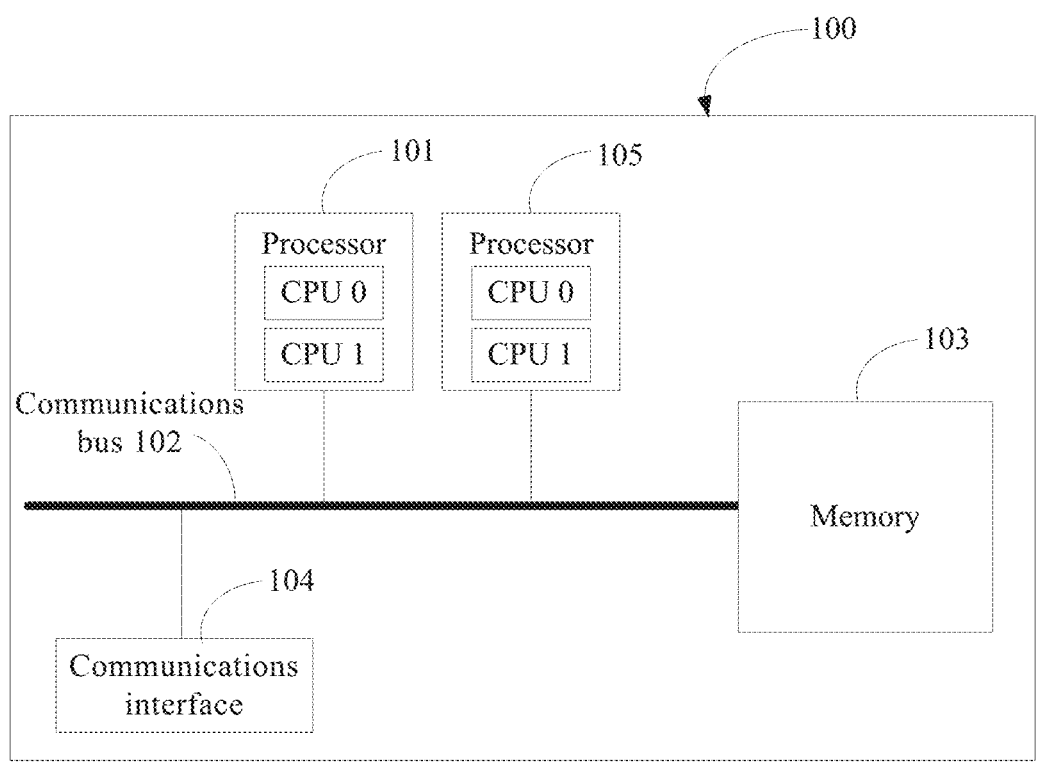
FIG. 1 is a schematic structural diagram of a computer device according to an embodiment of the present disclosure.

As shown in FIG. 1, FIG. 1 is a schematic structural diagram of a computer device (or system) provided by the present disclosure. The computer device is used to implement the method of the present disclosure.

The computer device 100 includes at least one processor 101, a communications bus 102, a memory 103, and at least one communications interface 104.

The processor 101 may be one processor, or may be a general designation of multiple processing units. For example, the processor 101 may be a general purpose central processing unit (CPU), or may be an application-specific integrated circuit (ASIC), or one or more integrated circuits configured to control execution of a program according to the solution of the present disclosure, for example, one or more digital signal processors (DSP), or one or more field programmable gate arrays (FPGA).

In a specific implementation, in an embodiment, the processor 101 may include one or more CPUs, for example, a CPU 0 and a CPU 1 in FIG. 1.

In a specific implementation, in an embodiment, the computer device 100 may include multiple processors, for example, the processor 101 and a processor 105 in FIG. 1. Each of the processors may be a single-core (single-CPU) processor, or may be a multi-core (multi-CPU) processor. The processor herein may be one or more devices, circuits, and/or processing cores used for processing data (for example, a computer program instruction).

The communications bus 102 may be an industry standard architecture (ISA) bus, a peripheral component interconnect (PCI) bus, an extended industry standard architecture (EISA) bus, or the like. The bus may be categorized as an address bus, a data bus, a control bus, or the like. For ease of indicating, the bus in FIG. 1 is indicated by only a bold line. However, this does not mean that only one bus or one type of bus exists.

The memory 103 may be a read-only memory (ROM) or other types of static storage devices capable of storing static information and instructions, or a random access memory (RAM) or other types of dynamic storage devices capable of storing information and instructions, or may be an electrically erasable programmable read-only memory (EEPROM), a compact disc read-only memory (CD-ROM), or an optical disc storage (including a compact disc, a laser disc, an optical disc, a digital versatile disc, a Blu-ray disc, or the like), a magnetic disk storage medium, or any other magnetic storage device, or any other medium that can be used to carry or store expected program code having an instruction or a data structure form and can be accessed by a computer. However, this is not limited. The memory may exist independently, and is connected to the processor by the bus. The memory may also be integrated with the processor.

The memory 103 is configured to store application program code for implementing a solution described in an embodiment of the present disclosure. The processor 101 is configured to execute the application program code stored in the memory 103.

The communications interface 104 is any transceiver, and is configured to communicate with another device or a communications network, for example, an Ethernet, a radio access network (RAN), or a wireless local area network (WLAN). The communications interface 104 may include a receiving unit for implementing a receiving function and a sending unit for implementing a sending function.

It should be noted that, to clearly describe the technical solutions of the embodiments of the present disclosure, terms such as "first" and "second" are used in the embodiments of the present disclosure to distinguish between same items or similar items that have basically the same functions or purposes. A person skilled in the art may understand that the terms such as "first" and "second" do not limit a quantity or an execution sequence.

Embodiment 1

Figure 2:
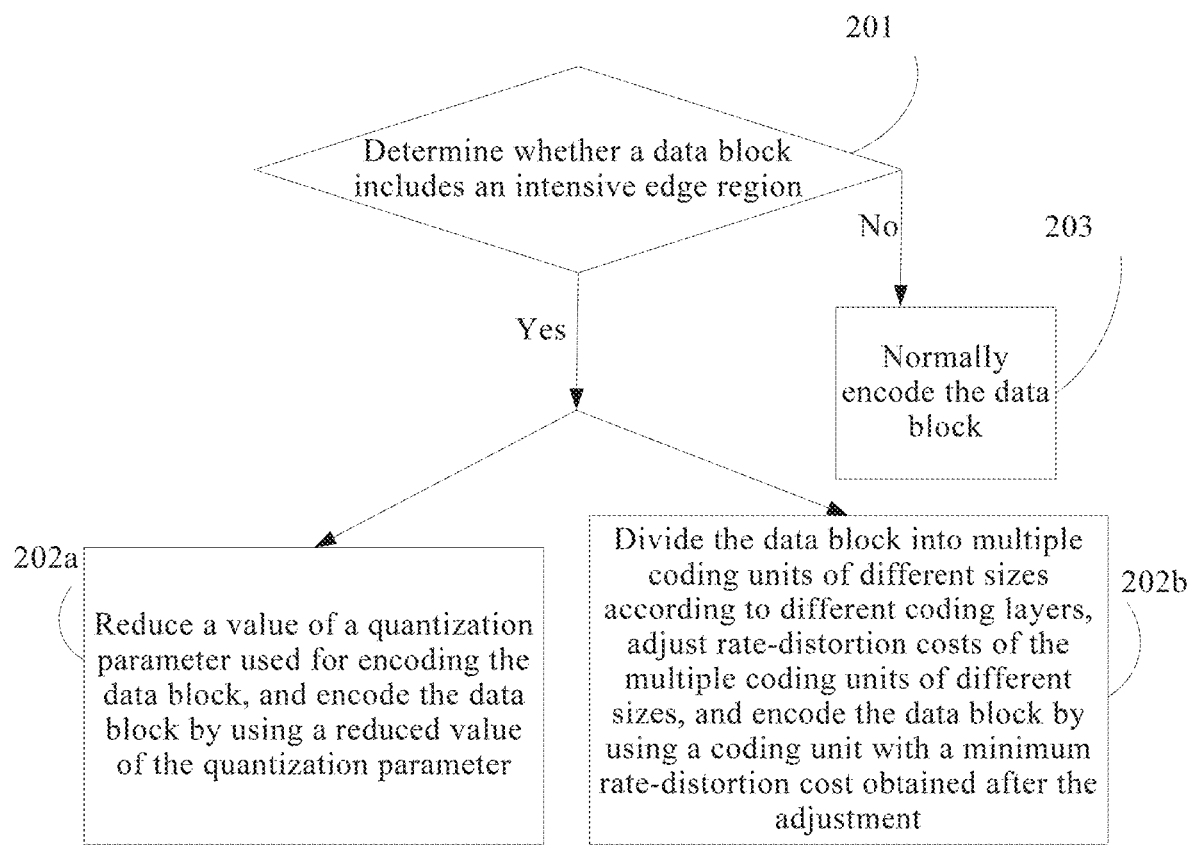
FIG. 2 is a flowchart of a data block encoding method according to an embodiment of the present disclosure.

This embodiment of the present disclosure provides a data block encoding method. As shown in FIG. 2, the method includes the following steps.

Step 201: Determine whether a data block includes an intensive edge region.

The intensive edge region is a region including an image distortion generated by ring noise, and the data block is any data block in a to-be-encoded image.

When it is determined that the data block includes an intensive edge region, step 202a or step 202b is performed. When it is determined that the data block does not include an intensive edge region, step 203 is performed.

Step 202a: Reduce a value of a quantization parameter used for encoding the data block, and encode the data block by using a reduced value of the quantization parameter.

The quantization parameter is a variable used for scaling up or down a transformed coefficient in an encoding or decoding process. Generally, if the value of the quantization parameter is greater, a corresponding quantization step is also greater.

Step 202b: Divide the data block into multiple coding units of different sizes according to different coding layers, adjust rate-distortion costs of the multiple coding units of different sizes, and encode the data block by using a coding unit with a minimum rate-distortion cost obtained after the adjustment.

A rate-distortion cost is a cost used for deciding an optimal encoding mode in an encoding process. Generally, for the rate-distortion cost, a distortion after encoding and a quantity of bits used in the encoding process are comprehensively considered.

Step 203: Normally encode the data block.

In this embodiment, first, whether each data block in multiple data blocks forming an image includes an intensive edge region is determined; then for a data block including an intensive edge region, a value of a quantization parameter is reduced, or a size of a coding unit of the data block is reduced by adjusting a rate-distortion cost of the coding unit of the data block. In this way, in a process of encoding an image by using a high compression rate, an image distortion phenomenon generated by fixed-pattern noise can be avoided effectively.

It should be noted that, when a to-be-encoded image is encoded, each data block included in the to-be-encoded image needs to be detected, so that a data block including an intensive edge region is detected. For each data block including an intensive edge region, step 202a or step 202b is performed.

Figure 3:
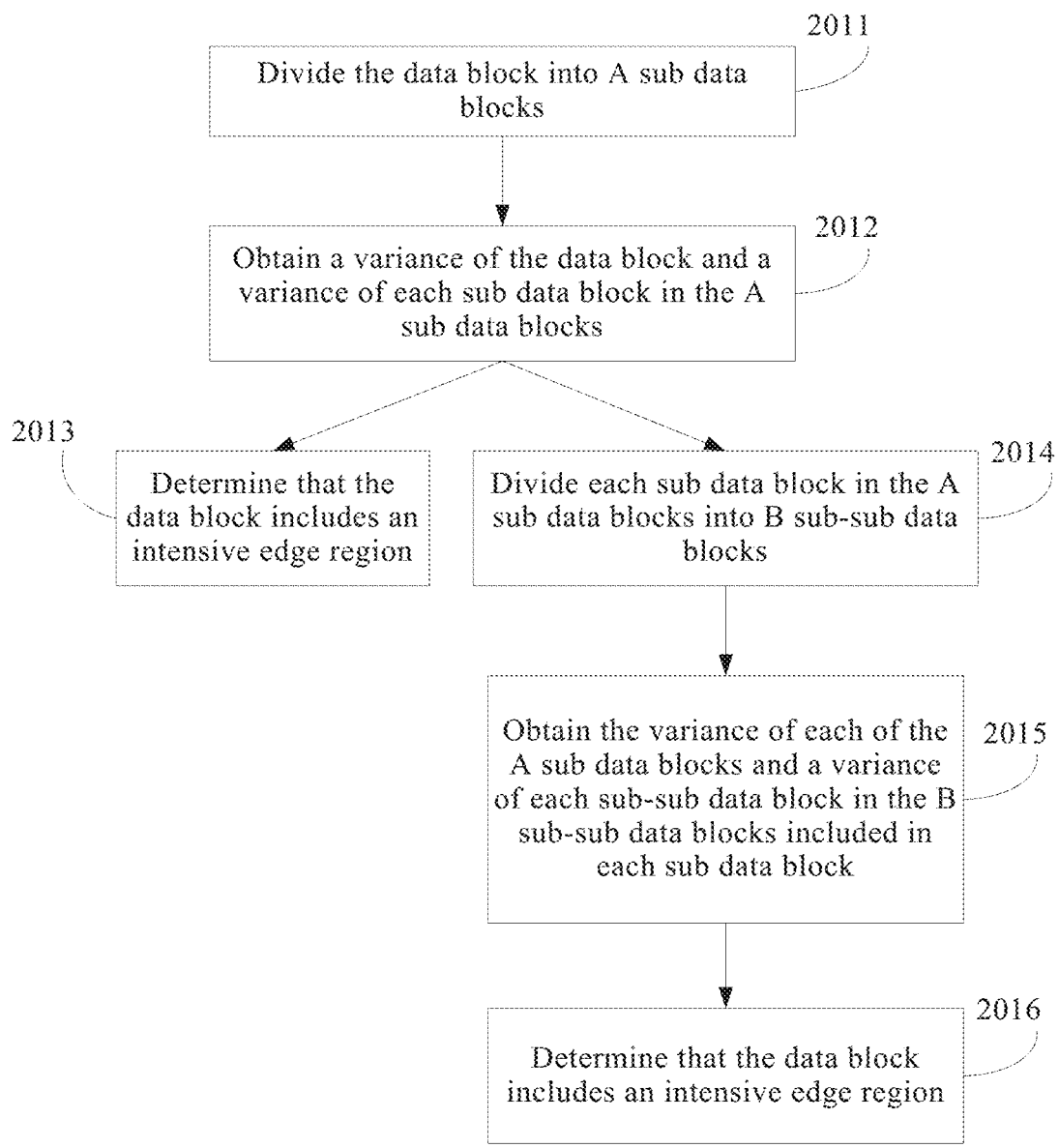
FIG. 3 is a flowchart of another data block encoding method according to an embodiment of the present disclosure.

Specifically, as shown in FIG. 3, step 201 of determining whether a data block includes an intensive edge region may include the following detailed steps.

Step 2011: Divide the data block into A sub data blocks.

A may be 4. A natural manner is to divide a large square data block into four small data blocks. This is because whether an intensive edge region is included is determined according to local statistics in the data block. For example, a size of a data block may be a 64×64 block, and a size of a sub data block may be a 32×32 block.

Step 2012: Obtain a variance of the data block and a variance of each sub data block in the A sub data blocks.

Specifically, the variance of the data block and the variance of each sub data block in the A sub data blocks may be obtained according to a variance formula. The variance formula is:

$$Var = \frac{1}{L \times M} \sum_{i=0}^{L \times M - 1} (Pix_i - \overline{Pix})^2,$$

where M indicates a width of the data block, L indicates a height of the data block, $Pix_i$ indicates a pixel value, and $\overline{Pix}$ indicates an average pixel value in the data block.

When the variance of the data block is greater than a first threshold, and in the variances of the A sub data blocks, a maximum variance is greater than k times a minimum variance, step 2013 is performed. When the variance of the data block is less than or equal to the first threshold, or in the variances of the A sub data blocks, the maximum variance is less than or equal to k times the minimum variance, it indicates that an intensive edge region of the data block may be in a middle position in the data block, and step 2014 is performed.

It should be noted that, the first threshold may be 128. According to experience, k is an integer. Preferably, k is 3, 4, or 5. The first threshold may be determined with reference to a bit width used by a pixel value in the image. Herein, we consider using typical eight bits to indicate a pixel value, and the pixel value of the image is in a range of 0 to 255.

Optionally, a data block including an intensive edge region may also be determined according to a standard deviation of the data block. A specific method for determining a data block including an intensive edge region according to a standard deviation of the data block is the same as a specific method for determining a data block including an intensive edge region according to a variance of the data block. When a data block including an intensive edge region is determined according to a standard deviation of the data block, the first threshold may be 32.

Step 2013: Determine that the data block includes an intensive edge region.

Step 2014: Divide each sub data block in the A sub data blocks into B sub-sub data blocks.

B is an integer greater than 0. Preferably, B is 4. A size of a sub data block may be a 32×32 block. A size of a sub-sub data block may be a 16×16 block.

Step 2015: Obtain the variance of each of the A sub data blocks and a variance of each sub-sub data block in the B sub-sub data blocks included in each sub data block.

The variance of each of the A sub data blocks and the variance of each sub-sub data block in the B sub-sub data blocks included in each sub data block may be obtained according to a variance formula.

When the variance of any sub data block is greater than the first threshold, and in the variances of the B sub-sub data blocks included in the any sub data block, a maximum variance is greater than k times a minimum variance, step 2016 is performed.

Step 2016: Determine that the data block includes an intensive edge region.

When any one of the data block, sub data blocks, or sub-sub data blocks includes an intensive edge region, it is determined that the data block includes an intensive edge region. When any one of the data block, sub data blocks, or sub-sub data blocks does not include an intensive edge region, the data block of the image is encoded normally.

Specifically, the value of the quantization parameter used for encoding the data block is reduced. The value of the quantization parameter used for encoding the data block may be reduced according to a first formula. The first formula is:

$$QP' = QP - \text{delta},$$

where QP' indicates a value of the quantization parameter after the adjustment, QP indicates a value of the quantization parameter before the adjustment, and delta indicates an adjustment magnitude. According to experience, if the quantization parameter is greater, a ring phenomenon occurs more easily. Therefore, generally, the quantization parameter is reduced. According to experience, delta is in a range of 0 to 15. Considering that more bits are occupied when a smaller quantization parameter is used in the encoding process, preferably, the value of delta is 4.

Figure 4:
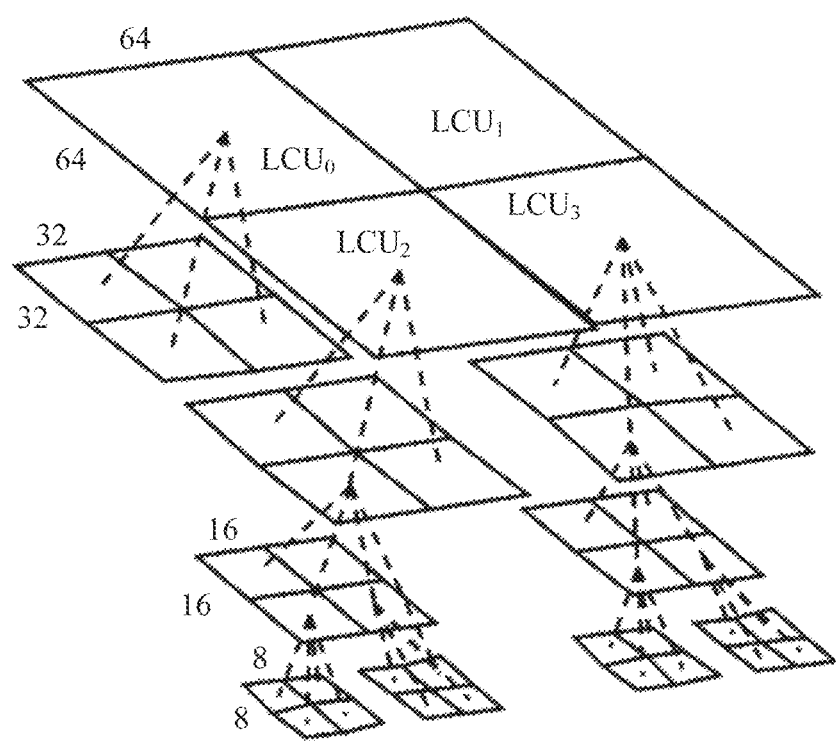
FIG. 4 is a schematic diagram of data block division according to an embodiment of the present disclosure.

FIG. 4 provides a manner of dividing a data block of 128×128 pixels and a largest coding unit (LCU) of a 64×64 size. During encoding, each largest coding unit is divided into smaller CUs according to a quadtree structure, until a maximum quantity of layers is reached. For example, a largest coding unit of the 64×64 size is divided into four coding units of a 32×32 size, a coding unit of the 32×32 size is divided into four coding units of a 16×16 size, and a coding unit of the 16×16 size is divided into four coding units of an 8×8 size. A CU is defined as a square whose height is 2 raised by an exponent, and its size may be 64×64, 32×32, 16×16, and 8×8. There are four modes in total, and corresponding quantities of coding layers are 0, 1, 2, and 3 in sequence.

For ease of description in the specification, a CU of the 64×64 size is expressed as a CU64. By analogy, a CU of the 32×32 size is expressed as a CU32, a CU of the 16×16 size is expressed as a CU16, and a CU of the 8×8 size is expressed as a CU8.

Specifically, the adjusting rate-distortion costs of the multiple coding units of different sizes includes: adjusting the rate-distortion costs of the multiple coding units of different sizes according to a second formula.

The adjusted rate-distortion costs of the coding units at various layers in the data block are compared. A rate-distortion cost of a CU64 is compared with a sum of rate-distortion costs of four CU32s, and a coding unit with a smaller rate-distortion cost is selected. Likewise, a rate-distortion cost of a CU32 is compared with a sum of rate-distortion costs of four CU16s, and a coding unit with a smaller rate-distortion cost is selected, and so on. A mode decision is made, and a coding unit having a minimum rate-distortion cost among the adjusted rate-distortion costs of the coding units at various layers in the data block is selected.

The second formula is:

$$RdoCost_N' = C_N \times RdoCost_N,$$

where $RdoCost_N'$ indicates a rate-distortion cost of a coding unit of a size N after the adjustment, $C_N$ indicates a first adjustment coefficient corresponding to the coding unit of the size N, $RdoCost_N$ indicates a rate-distortion cost of the coding unit of the size N before the adjustment, and N indicates the size of the coding unit.

Mode information for making a mode decision includes inter-layer quadtree transform division (division of a coding unit size), a prediction mode (intra-frame or inter-frame) of each coding unit, residual quadtree transform (RQT) division of each coding unit, and the like.

Further, before the size of the coding unit of the data block is reduced according to the rate-distortion cost of the coding unit of the data block, an adjustment coefficient of the rate-distortion cost of the coding unit of the data block needs to be preset. It should be noted that, to avoid an image distortion phenomenon generated by ring noise, a smaller coding unit is selected preferentially. Therefore, for the setting of the adjustment weight, the sizes of the coding units may be reduced gradually, that is, $C_{64} > C_{32} > C_{16} > C_8$. For example, $C_{64} = 2.0$, $C_{32} = 1.5$, $C_{16} = 1.0$, and $C_8 = 0.9$. According to the same method, control over preferential selection of a transform unit size in the encoding process may be designed.

Embodiment 2

Figure 5:
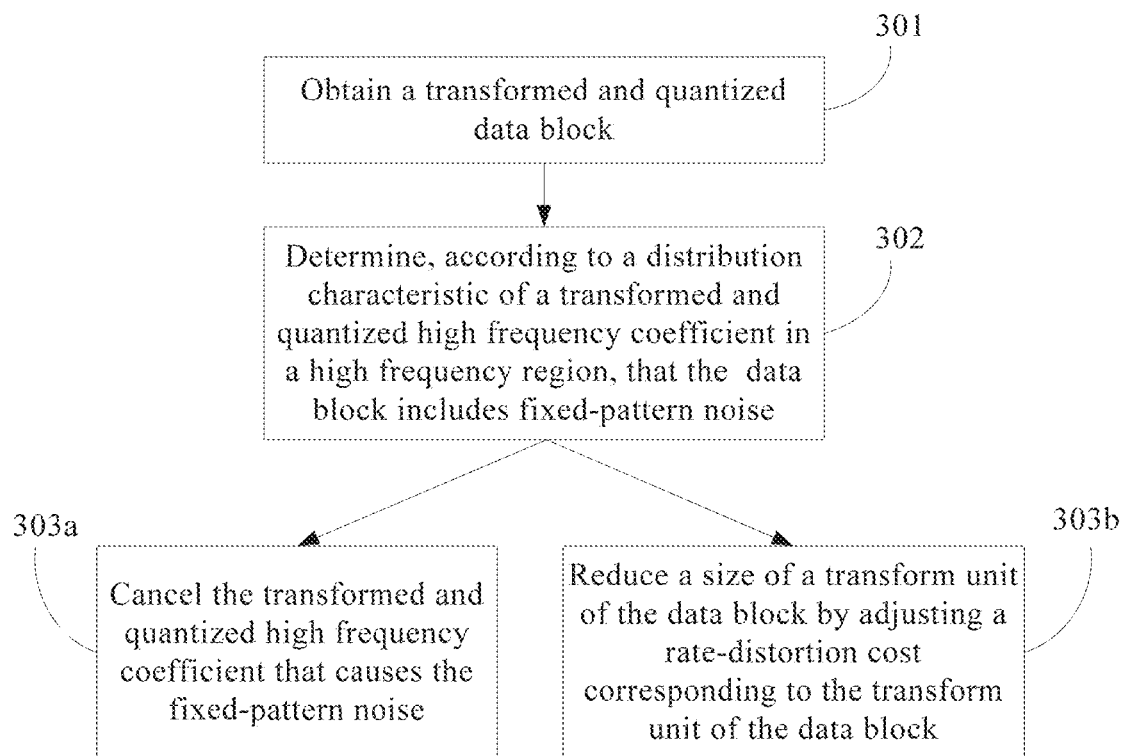
FIG. 5 is a flowchart of still another data block encoding method according to an embodiment of the present disclosure.

This embodiment of the present disclosure provides a data block encoding method. As shown in FIG. 5, the method includes the following steps.

Step 301: Obtain a transformed and quantized data block.

The transformed and quantized data block includes a high frequency region, the high frequency region includes a transformed and quantized high frequency coefficient, and the data block is a data block in a to-be-encoded image.

Transform is a specific operation performed on residual data in an encoding process. This operation generally refers to discrete cosine transform or discrete sine transform.

Quantization is a scaling operation performed on a transformed coefficient in the encoding process to facilitate subsequent encoding.

Step 302: Determine, according to a distribution characteristic of a transformed and quantized high frequency coefficient in a high frequency region, that the data block includes fixed-pattern noise.

Figure 6:
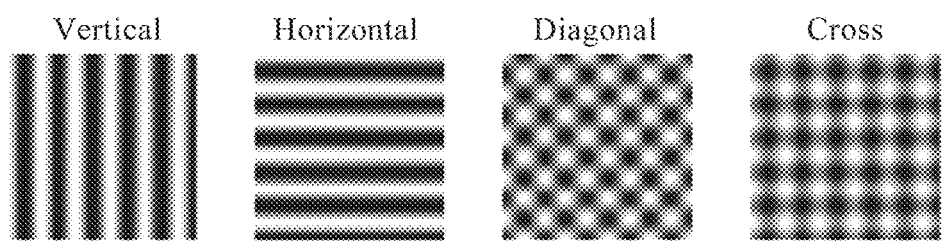
FIG. 6 is a schematic diagram of typical fixed-pattern noise according to an embodiment of the present disclosure.

A source of fixed-pattern noise mainly lies in: when encoding is performed by using a greater quantization parameter, because there are isolated or few residual frequency components of a transformed and quantized coefficient in an intermediate or high frequency region, the isolated frequency components are represented in a form of fixed-pattern noise after they are inversely transformed back to a space domain. When the reconstructed residual data is superimposed on a predicted data block that does not include any texture or includes few textures, a reconstructed data block is represented as including the fixed-pattern noise. The fixed-pattern noise is ring noise in essence. However, the fixed-pattern noise generally occurs in a region with an intensive texture. General representations include a horizontal pattern, a vertical pattern, a diagonal grid pattern, and a cross grid pattern. FIG. 6 shows typical fixed-pattern noise. These patterns are generated mainly because there are different residual frequency components in different positions in a quantization process. Consequently, subjective image quality is affected greatly. In addition, fixed-pattern noise likely occurs in a lossy compression process when a size of a transform unit is greater than 8×8. As the size of the transform unit increases, the fixed-pattern noise becomes more obvious, and subjective quality is affected more severely.

Step 303a: Cancel the transformed and quantized high frequency coefficient that causes the fixed-pattern noise.

Step 303b: Reduce a size of a transform unit of the data block by adjusting a rate-distortion cost of the transform unit of the data block.

The rate-distortion cost of the current transform unit of the data block is adjusted, so that a smaller transform unit is forcibly selected in a mode decision process of the data block.

Operations of steps 303a and 303b may be performed simultaneously, or may be performed separately.

In this embodiment, first, it may be determined, according to a distribution characteristic of a transformed and quantized high frequency coefficient of a high frequency region included in a transformed and quantized data block, in the high frequency region, that the data block includes fixed-pattern noise. Then, the transformed and quantized high frequency coefficient that causes the fixed-pattern noise is canceled; or a size of a transform unit of the data block is reduced by adjusting a rate-distortion cost of the transform unit of the data block. In this way, in a process of encoding an image by using a high compression rate, an image distortion phenomenon generated by fixed-pattern noise can be avoided effectively.

Figure 7:
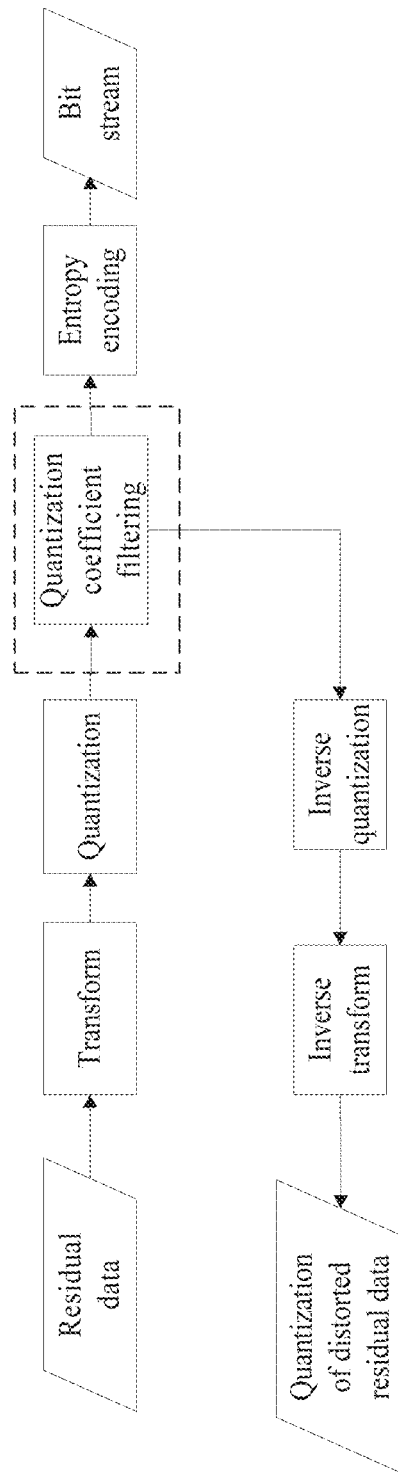
FIG. 7 is a schematic image processing flowchart according to an embodiment of the present disclosure.

As shown in FIG. 7, FIG. 7 is a schematic image processing flowchart. A quantization coefficient filtering module is a module added to an existing procedure, and mainly performs step 301 to step 303b.

It should be noted that, the high frequency region includes a high frequency region in which a horizontal component is preponderant, a high frequency region in which a vertical component is preponderant, and a high frequency region in which an angular component is preponderant.

Figure 8:
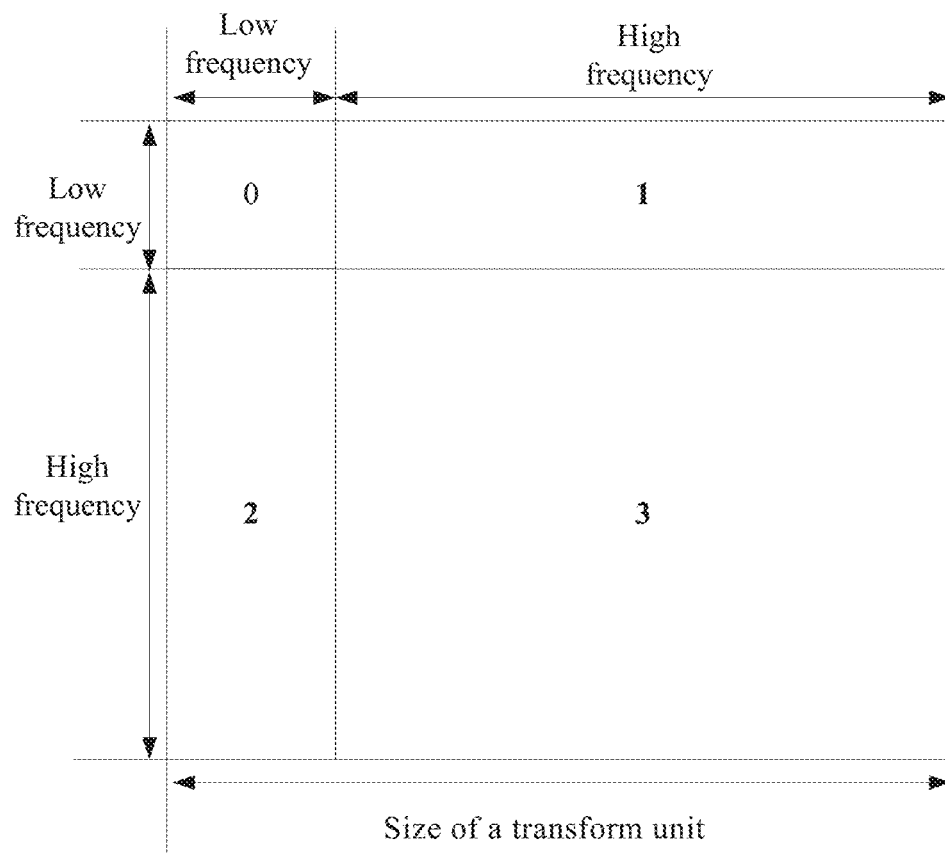
FIG. 8 is a schematic diagram of distribution of high frequency coefficients of a transformed and quantized data block according to an embodiment of the present disclosure.

FIG. 8 shows a schematic diagram of distribution of high frequency coefficients of a transformed and quantized data block. According to different positions of frequency components included in the data block, transformed and quantized high frequency coefficients are divided into four parts. A region 0 includes a low frequency coefficient part of a direct current component. A region 1 includes a high frequency coefficient part in which a horizontal component is preponderant. A region 2 includes a high frequency coefficient part in which a vertical component is preponderant. A region 3 includes a high frequency coefficient part in which an angular component is preponderant. Sizes of regions of various parts may be adjusted by using external parameters. According to experience, for a transform unit of a 32×32 size (TU32) in which a width of a low frequency region is typically set to 4, a width of a high frequency region is 28; for a transform unit of a 16×16 (TU16) in which a width of a low frequency region is typically set to 4 or 2, a width of a high frequency region is 12 or 14.

It should be noted that, the distribution of the high frequency coefficients of the transformed and quantized data block may also be expressed by using a triangle or other forms.

Figure 9:
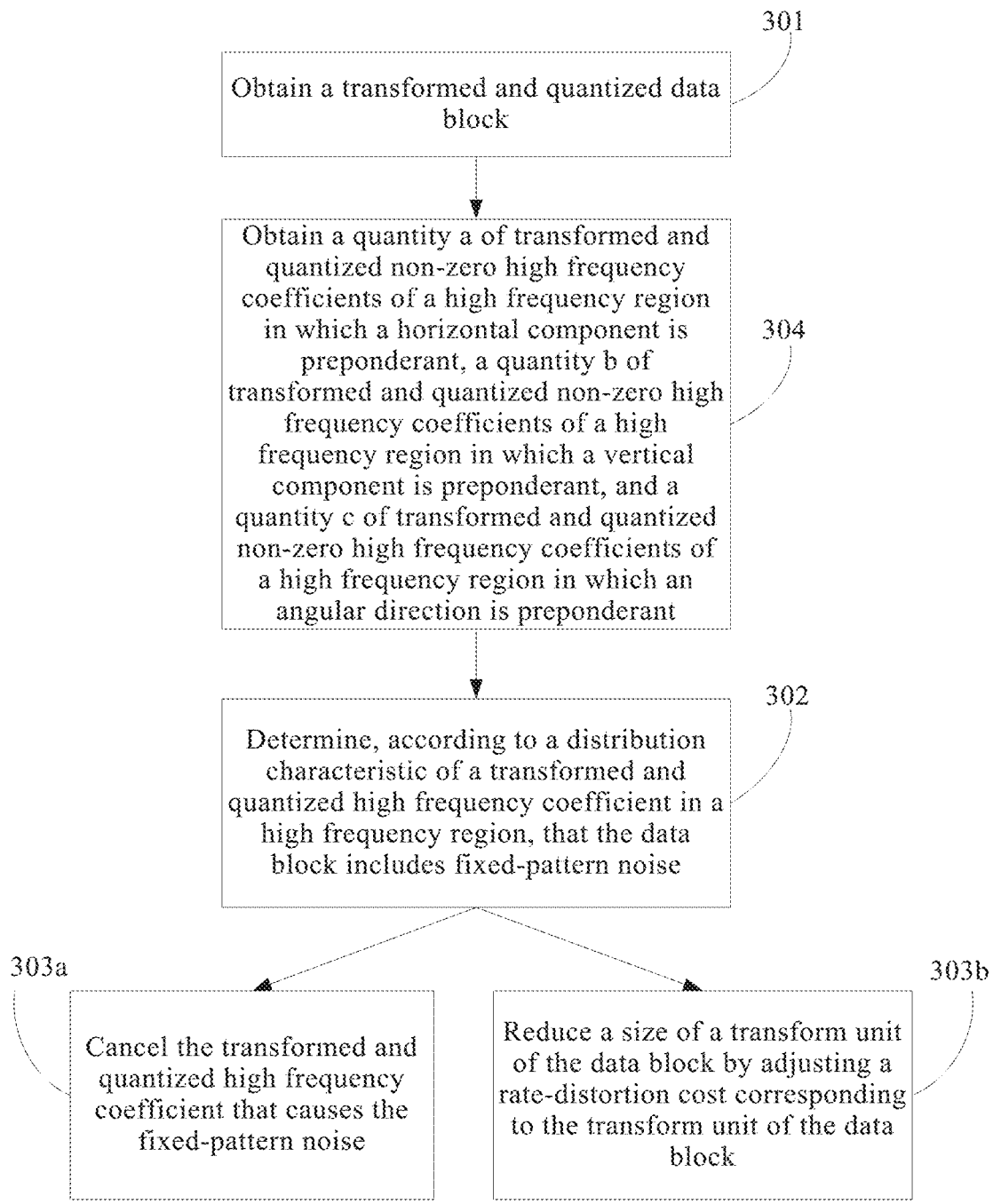
FIG. 9 is a flowchart of yet another data block encoding method according to an embodiment of the present disclosure.

As shown in FIG. 9, before the determining, according to a distribution characteristic of a transformed and quantized high frequency coefficient in a high frequency region, that the data block includes fixed-pattern noise, the method includes the following detailed step.

Step 304: Obtain a quantity a of transformed and quantized non-zero high frequency coefficients of a high frequency region in which a horizontal component is preponderant, a quantity b of transformed and quantized non-zero high frequency coefficients of a high frequency region in which a vertical component is preponderant, and a quantity c of transformed and quantized non-zero high frequency coefficients of a high frequency region in which an angular component is preponderant.

The determining, according to a distribution characteristic of the transformed and quantized high frequency coefficient in the high frequency region, that the data block includes fixed-pattern noise, specifically includes:

when a is greater than 0 but less than a second threshold, and b is equal to 0, and c is equal to 0, determining that the transformed and quantized non-zero high frequency coefficients of the high frequency region in which the horizontal component is preponderant cause the fixed-pattern noise;

when b is greater than 0 but less than a second threshold, and a is equal to 0, and c is equal to 0, determining that the transformed and quantized non-zero high frequency coefficients of the high frequency region in which the vertical component is preponderant cause the fixed-pattern noise;

when c is greater than 0 but less than a second threshold, and a is equal to 0, and b is equal to 0, determining that the transformed and quantized non-zero high frequency coefficients of the high frequency region in which the angular component is preponderant cause the fixed-pattern noise;

when a sum of a and b is greater than 0 but less than a third threshold, and a is greater than 0, and b is greater than 0, and c is equal to 0, determining that the transformed and quantized non-zero high frequency coefficients of the high frequency region in which the horizontal component is preponderant and the transformed and quantized non-zero high frequency coefficients of the high frequency region in which the vertical component is preponderant jointly cause the fixed-pattern noise;

when a sum of b and c is greater than 0 but less than a third threshold, and b is greater than 0, and c is greater than 0, and a is equal to 0, determining that the transformed and quantized non-zero high frequency coefficients of the high frequency region in which the vertical component is preponderant and the transformed and quantized non-zero high frequency coefficients of the high frequency region in which the angular component is preponderant jointly cause the fixed-pattern noise;

when a sum of a and c is greater than 0 but less than a third threshold, and a is greater than 0, and c is greater than 0, and b is equal to 0, determining that the transformed and quantized non-zero high frequency coefficients of the high frequency region in which the horizontal component is preponderant and the transformed and quantized non-zero high frequency coefficients of the high frequency region in which the angular component is preponderant jointly cause the fixed-pattern noise; or when a sum of a, b, and c is greater than 0 but less than a fourth threshold, and a is greater than 0, and b is greater than 0, and c is greater than 0, determining that the transformed and quantized non-zero high frequency coefficients of the high frequency region in which the horizontal component is preponderant, the transformed and quantized non-zero high frequency coefficients of the high frequency region in which the vertical component is preponderant, and the transformed and quantized non-zero high frequency coefficients of the high frequency region in which the angular component is preponderant jointly cause the fixed-pattern noise.

The canceling the transformed and quantized high frequency coefficient that causes the fixed-pattern noise specifically includes: quantizing the non-zero high frequency coefficients of the high frequency regions included in the data block to 0.

Optionally, the non-zero high frequency coefficients of the high frequency regions included in the data block may be deleted directly, so that the transformed and quantized high frequency coefficients of the data block are canceled.

The reducing a size of a transform unit of the data block by adjusting a rate-distortion cost of the transform unit of the data block specifically includes:

adjusting, according to a third formula, the rate-distortion cost of the transform unit of the data block, where the third formula is:

$$RdoCost_N' = \alpha \times RdoCost_N,$$

where $RdoCost_N'$ indicates a rate-distortion cost of a transform unit of a size N after the adjustment, $\alpha$ indicates a second adjustment coefficient, the second adjustment coefficient is an integer greater than 1, $RdoCost_N$ indicates a rate-distortion cost of the transform unit of the size N before the adjustment, and N indicates the size of the transform unit of the data block.

The distribution characteristic of the to-be-detected quantization coefficients that meet the foregoing conditions may be summarized as follows: Distribution of the quantization coefficients of the high frequency regions is uneven, or the quantity of the quantization coefficients of the high frequency regions is small. According to experience, for a TU32, the second threshold may be set to 3 or 4, the third threshold may be set to 5 or 6, and the fourth threshold may be set to 4 or 5. For a TU16, a threshold that is the same as or less than that of the TU32 may be used.

Assuming that a size of a transform unit used by a current coding unit is 32, and that a rate-distortion cost for encoding is $RdoCost_{32}$, a manner of adjusting the rate-distortion cost is:

$$RdoCost_{32}' = \alpha \times RdoCost_{32},$$

where the second adjustment coefficient $\alpha$ is set to an integer greater than 1, and 2 may be selected according to experience. The foregoing operations are mainly performed for the TU32 and the TU16. A result of such operations is: generally, a smaller coding unit (CU8 or CU4) or transform unit (TU8 or TU4) is preferentially selected in the encoding process, and an objective of canceling and suppressing the fixed-pattern noise is achieved.

Embodiment 3

Figure 10:
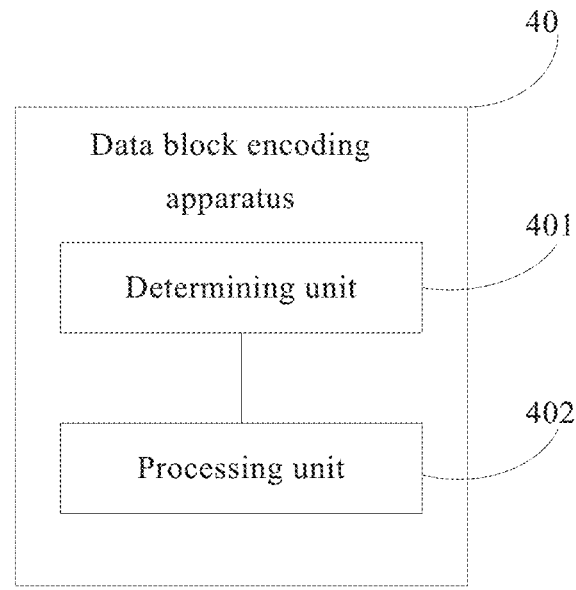
FIG. 10 is a schematic structural diagram of a data block encoding apparatus according to an embodiment of the present disclosure.

This embodiment of the present disclosure provides a data block encoding apparatus 40. As shown in FIG. 10, the apparatus includes:

a determining unit 401, configured to determine whether a data block includes an intensive edge region, where the intensive edge region is a region including an image distortion generated by ring noise, and the data block is any data block in a to-be-encoded image; and a processing unit 402, configured to: when the data block includes an intensive edge region, reduce a value of a quantization parameter QP used for encoding the data block, and encode the data block by using a reduced value of the quantization parameter; or when the data block includes an intensive edge region, divide the data block into multiple coding units of different sizes according to different coding layers, adjust rate-distortion costs of the multiple coding units of different sizes, and encode the data block by using a coding unit with a minimum rate-distortion cost obtained after the adjustment.

In this embodiment, the data block encoding apparatus 40 is presented in a form of a functional unit. The "unit" herein may be an ASIC, a processor and a memory for executing one or more software or firmware programs, an integrated logic circuit, and/or other devices that can provide the foregoing functions. In a simple embodiment, a person skilled in the art may think that the data block encoding apparatus 40 may use the form shown in FIG. 10. The determining unit 401 and the processing unit 402 may be implemented by using the hardware structure in FIG. 1.

Embodiment 4

Figure 11:
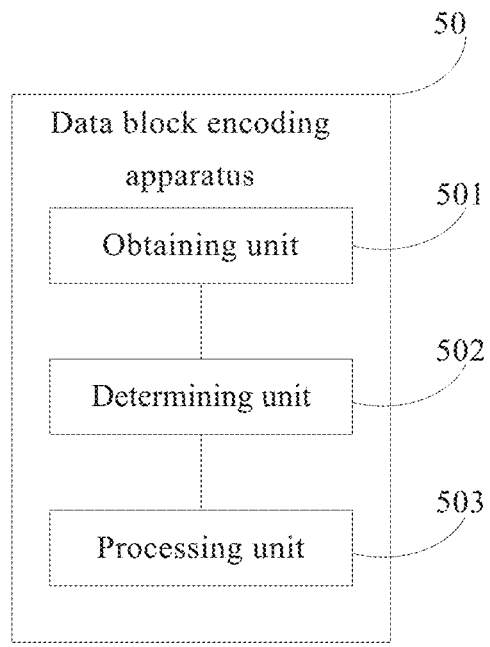
FIG. 11 is a schematic structural diagram of another data block encoding apparatus according to an embodiment of the present disclosure.

This embodiment of the present disclosure provides a data block encoding apparatus 50. As shown in FIG. 11, the apparatus includes:

an obtaining unit 501, configured to obtain a transformed and quantized data block, where the transformed and quantized data block includes a high frequency region, the high frequency region includes a transformed and quantized high frequency coefficient, and the data block is a data block in a to-be-encoded image;

a determining unit 502, configured to determine, according to a distribution characteristic of the transformed and quantized high frequency coefficient in the high frequency region, that the data block includes fixed-pattern noise; and a processing unit 503, configured to cancel the transformed and quantized high frequency coefficient that causes the fixed-pattern noise, or reduce a size of a transform unit of the data block by adjusting a rate-distortion cost of the transform unit of the data block.

In this embodiment, the data block encoding apparatus 50 is presented in a form of a functional unit. The "unit" herein may be an ASIC, a processor and a memory for executing one or more software or firmware programs, an integrated logic circuit, and/or other devices that can provide the foregoing functions. In a simple embodiment, a person skilled in the art may think that the data block encoding apparatus 50 may use the form shown in FIG. 11. The obtaining unit 501, the determining unit 502, and the processing unit 503 may be implemented by using the hardware structure in FIG. 1.

This embodiment of the present disclosure further provides a computer storage medium, configured to store a computer software instruction used by the data block encoding apparatus shown in FIG. 10. The computer storage medium includes a program designed for executing the foregoing method embodiment. Image processing may be implemented by executing the stored program.

This embodiment of the present disclosure further provides a computer storage medium, configured to store a computer software instruction used by the data block encoding apparatus shown in FIG. 11. The computer storage medium includes a program designed for executing the foregoing method embodiment. Image processing may be implemented by executing the stored program.

For the same or similar part of the embodiments in this specification, reference may be made to each other. Details are not described again herein.

It may be clearly understood by a person skilled in the art that, for the purpose of convenient and brief description, for a detailed working process of the foregoing apparatus and unit, reference may be made to a corresponding process in the foregoing method embodiments, and details are not described herein.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data block encoding method, comprising:
determining whether a data block comprises an intensive edge region comprising an image distortion generated by ring noise, wherein the data block is a data block in a to-be-encoded image; and
when the data block comprises an intensive edge region, dividing the data block into multiple coding units of different sizes according to different coding layers, adjusting rate-distortion costs of the multiple coding units of different sizes, wherein the adjustment of the rate-distortion cost of a coding unit is proportional to the size of the coding unit and wherein the adjusted rate-distortion cost of a coding unit is based upon a formula that indicates a rate-distortion cost of a coding unit of size N after an adjustment is equal to an adjustment coefficient corresponding to the coding unit of size N multiplied by the rate-distortion cost of the coding unit of size N before the adjustment and wherein the value of the adjustment coefficient is proportional to the size of the coding unit,
encoding the data block by using a coding unit with a minimum rate-distortion cost obtained after the adjustment.

2. The method according to claim 1, wherein determining whether a data block comprises an intensive edge region comprises:
dividing the data block into A sub data blocks;
obtaining a variance of the data block and a variance of each sub data block in the A sub data blocks; and when the variance of the data block is greater than a first threshold, and in the variances of the A sub data blocks a maximum variance is greater than k times a minimum variance, determining that the data block comprises an intensive edge region, wherein A is a positive integer greater than or equal to 2, k is an integer, and the first threshold is determined by a bit width used by a pixel value in the to-be-encoded image.

3. The method according to claim 2, wherein when the variance of the data block is less than or equal to the first threshold, or in the variances of the A sub data blocks the maximum variance is less than or equal to k times the minimum variance, the method further comprises:
dividing each sub data block in the A sub data blocks into B sub-sub data blocks, wherein B is an integer greater than 0;
obtaining the variance of each of the A sub data blocks and a variance of each of the B sub-sub data blocks comprised in each sub data block; and
when the variance of any sub data block is greater than the first threshold, and in the variances of the B sub-sub data blocks comprised in the any sub data block a maximum variance is greater than k times a minimum variance, determining that the data block comprises an intensive edge region.

4. The method according to claim 1, further comprising reducing a value of a quantization parameter used for encoding the data block comprising:
reducing, according to a first formula, the value of the quantization parameter used for encoding the data block, wherein the first formula is:

$$QP'=QP-\text{delta},$$

wherein QP' indicates a value of the quantization parameter after the adjustment, QP indicates a value of the quantization parameter before the adjustment, delta indicates an adjustment magnitude, and the adjustment magnitude is any integer greater than 0 but less than 15.

5. The method according to claim 1, wherein adjusting rate-distortion costs of the multiple coding units of different sizes comprises:
adjusting the rate-distortion costs of the multiple coding units of different sizes according to the formula, wherein the formula is:

$$RdoCost_N'=C_N \times RdoCost_N,$$

wherein $RdoCost_N'$ indicates the rate-distortion cost of the coding unit of the size N after the adjustment, $C_N$ indicates the adjustment coefficient corresponding to the coding unit of the size N, a value of the adjustment coefficient is proportional to the size of the coding unit, $RdoCost_N$ indicates the rate-distortion cost of the coding unit of the size N before the adjustment, and N indicates the size of the coding unit.

6. A data block encoding apparatus, comprising:
a non-transitory computer readable medium configured to store instructions; and
a processor configured to execute the instructions stored in the non-transitory computer readable medium to:
determine whether a data block comprises an intensive edge region comprising an image distortion generated by ring noise, wherein the data block is a data block in a to-be-encoded image; and
when the data block comprises an intensive edge region, divide the data block into multiple coding units of different sizes according to different coding layers, adjust rate-distortion costs of the multiple coding units of different sizes, wherein the adjustment of the rate-distortion cost of a coding unit is proportional to the size of the coding unit, and wherein the adjusted rate-distortion cost of a coding unit is based upon a formula that indicates a rate-distortion cost of a coding unit of size N after an adjustment is equal to an adjustment coefficient corresponding to the coding unit of size N multiplied by the rate-distortion cost of the coding unit of size N before the adjustment and wherein the value of the adjustment coefficient is proportional to the size of the coding unit, and encode the data block by using a coding unit with a minimum rate-distortion cost obtained after the adjustment.

7. The apparatus according to claim 6, wherein the processor is configured to:
divide the data block into A sub data blocks;
obtain a variance of the data block and a variance of each sub data block in the A sub data blocks; and
when the variance of the data block is greater than a first threshold, and in the variances of the A sub data blocks a maximum variance is greater than k times a minimum variance, determine that the data block comprises an intensive edge region, wherein A is a positive integer greater than or equal to 2, k is an integer, and the first threshold is determined by a bit width used by a pixel value in the to-be-encoded image.

8. The apparatus according to claim 7, wherein when the variance of the data block is less than or equal to the first threshold, or in the variances of the A sub data blocks, the maximum variance is less than or equal to k times the minimum variance, the processor is further configured to:
divide each sub data block in the A sub data blocks into B sub-sub data blocks, wherein B is an integer greater than 0;
obtain the variance of each of the A sub data blocks and a variance of each sub-sub data block in the B sub-sub data blocks comprised in each sub data block; and
when the variance of any sub data block is greater than the first threshold, and in the variances of the B sub-sub data blocks comprised in the any sub data block a maximum variance is greater than k times a minimum variance, determine that the data block comprises an intensive edge region.

9. The apparatus according to claim 6, wherein the processor is configured to:
reduce, according to a first formula, a value of a quantization parameter used for encoding the data block, wherein the first formula is:

$$QP'=QP-\text{delta},$$

wherein QP' indicates a value of the quantization parameter after the adjustment, QP indicates a value of the quantization parameter before the adjustment, delta indicates an adjustment magnitude, and the adjustment magnitude is any integer greater than 0 but less than 15.

10. The apparatus according to claim 6, wherein the processor is configured to:
adjust the rate-distortion costs of the multiple coding units of different sizes according to the formula, wherein the formula is:

$$RdoCost_N'=C_N \times RdoCost_N,$$

wherein $RdoCost_N'$ indicates the rate-distortion cost of the coding unit of the size N after the adjustment, $C_N$ indicates the adjustment coefficient corresponding to the coding unit of the size N, a value of the adjustment coefficient is proportional to the size of the coding unit, $RdoCost_N$ indicates the rate-distortion cost of the coding unit of the size N before the adjustment, and N indicates the size of the coding unit.

\* \* \* \* \*